(12) United States Patent
Hajebi et al.

(10) Patent No.: US 11,532,301 B1
(45) Date of Patent: Dec. 20, 2022

(54) NATURAL LANGUAGE PROCESSING

(71) Applicant: Amazon Technologies, Inc., Seattle, WA (US)

(72) Inventors: Kiana Hajebi, Seattle, WA (US); Vivek Yadav, Issaquah, WA (US); Pradeep Natarajan, Chicago, IL (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

(21) Appl. No.: 17/113,823

(22) Filed: Dec. 7, 2020

(51) Int. Cl.
  *G10L 15/22* (2006.01)
  *G10L 15/18* (2013.01)
(52) U.S. Cl.
  CPC .......... *G10L 15/1815* (2013.01); *G10L 15/22* (2013.01)

(58) Field of Classification Search
  CPC .................... G10L 15/22; G10L 15/1815
  See application file for complete search history.

(56) References Cited

U.S. PATENT DOCUMENTS 10,880,384 B1 * 12/2020 Li ..................... G10L 15/22
2019/0080685 A1 * 3/2019 Johnson, Jr. ....... G06Q 30/0256

* cited by examiner

*Primary Examiner* — Ibrahim Siddo
(74) *Attorney, Agent, or Firm* — K&L Gates LLP

(57) ABSTRACT

Devices and techniques are generally described for inference reduction in natural language processing using semantic similarity-based caching. In various examples, first automatic speech recognition (ASR) data representing a first natural language input may be determined. A cache may be searched using the first ASR data. A first skill associated with the first ASR data may be determined from the cache. In some examples, first intent data representing a semantic interpretation of the first natural language input data may be determined by using a first natural language process associated with the first skill.

20 Claims, 10 Drawing Sheets

NATURAL LANGUAGE PROCESSING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
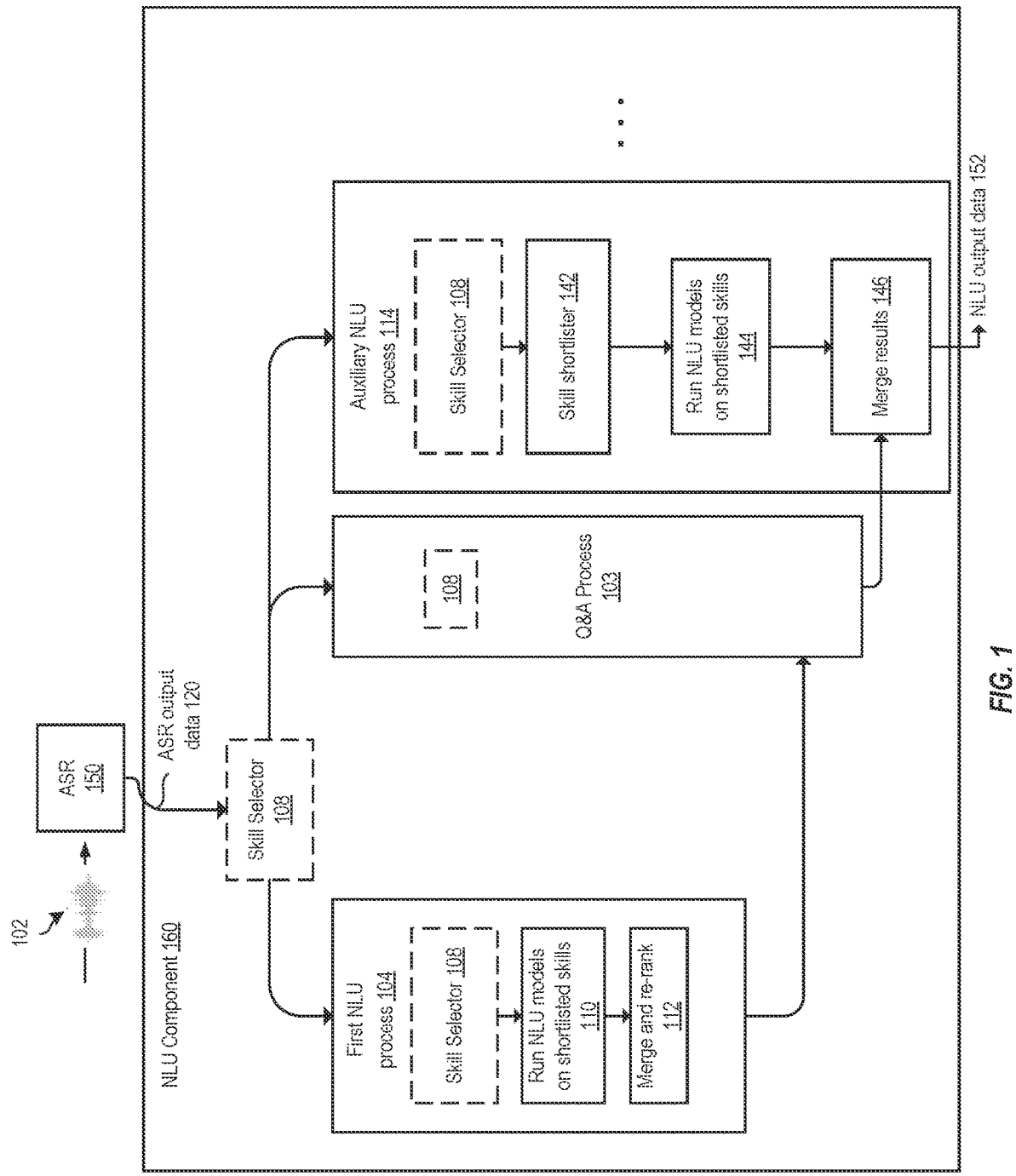
FIG. 1 is a block diagram illustrating cache-based skill selection for natural language processing, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. As described in further detail below, in some examples, NLU processing may include multiple different processes that may be executed for a given natural language input in order to determine a semantic interpretation of the natural language input. Text-to-speech (TTS) is a field of computer science, artificial intelligence, and linguistics concerned with enabling computers to output synthesized speech. ASR, NLU, and TTS may be used together as part of a speech processing system. As used in, natural language input data may comprise audio data (e.g., representing a user request or command), text data, and/or other representation data representing natural language for input into a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a speech processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware)

used during speech processing to take an action in response to input request data (e.g., natural language inputs such as user utterances and/or text). Such applications may include speech processing skills, speechlets, and/or other types of speech processing software.

In various examples, speech processing systems may determine an action to take for processing particular request data according to an interpretation of the natural language input (represented by the request data), as determined by NLU. In various examples, multiple NLU processes may be executed for a given natural language input as some processes may be more effective in deriving semantic meaning from particular types of utterances and/or other natural language inputs. For example, a specific NLU process flow may correspond to a particular speech processing skill or group of skills. For example, a first NLU process may correspond to a food skill configured to perform actions related to food (e.g., displaying recipes, answering questions about nutritional information, providing measurement conversions, etc.). The first NLU process for the food skill may generate intent data indicating a semantic interpretation of the input natural language data (e.g., a user utterance) in the context of the food domain. In some examples, a list of intents may be output by the NLU process. Each intent in such a list may correspond to a confidence score indicating a confidence and/or applicability of the particular intent for the input natural language data.

NLU processes may be computationally expensive as a given NLU process flow may involve execution of one or more machine learning models (e.g., deep neural networks, etc.), graph searches, heuristic systems, etc. Additionally, in various examples, upon receipt of a natural language input (e.g., a user request) several NLU processes may be executed in parallel. For example, for a natural language input "Play Happiness," a general NLU process flow, a video NLU process flow, a music NLU process flow, a question-and-answer NLU process flow, etc. (e.g., skill-specific NLU processes), may be executed to determine various skill-specific intents for the natural language input. In some examples, more than thirty NLU processes may be executed for a given natural language input. In many cases, there is a small number of skills to which any given natural language input is applicable. Accordingly, executing a large number of skill-specific NLU processes may be computationally wasteful. In some examples, to address this problem, skill shortlister components are used to determine a list of the skills most likely to be applicable to a given natural language input. However, such shortlister components are typically also large neural networks (and/or other relatively heavy-weight machine learned models) that are also computationally expensive in terms of processing power and memory requirements.

Described herein is a cache-based skill selector that is configured to store a list of historical skills used to process particular natural language inputs (e.g., utterances) in one or more storage components. In various examples, the storage components may include Level-1 cache (e.g., a cache on the same chip as a microprocessor), Level-2 cache (e.g., cache on a separate chip with respect to the microprocessor), L3 cache (e.g., larger, more remote cache with respect to the microprocessor), and/or other types of non-transitory computer readable memory. In various examples, the next time the same utterance is used, the list of skills that have historically been used to process the utterance may be retrieved from the cache or other storage component. Thereafter, the NLU processes specific to this set of skills may be executed and the natural language input may be routed to one or more of the skills (e.g., on the basis of the NLU process output data having the highest confidence score). Notably, in such an approach, a confined set of skill-specific NLU processes are executed, as opposed to executing a skill-specific NLU process for every skill (or a large number of skills).

In various examples, common utterances (e.g., "What is the weather forecast?") that have been received greater than a threshold number of times may be cached. The next time an identical utterance is received, the list of skills historically used to process the utterance (e.g., a weather skill in the current example) may be retrieved from the cache and a skill-specific NLU process for that skill may be executed without having to load and/or execute a shortlister machine learned model and/or without having to execute skill-specific NLU models for a large number of skills—many of which may be irrelevant to the current utterance.

Additionally, less common utterances may be cached in association with a set of skills historically used to process semantically similar utterances. For example, a relatively uncommon utterance may be "Give me my weather update." As described in further detail below, a determination may be made that such an utterance is semantically similar to the utterance "what is the weather forecast." Accordingly, the list of skills historically used to process the "what is the weather forecast" utterance may be retrieved from the cache. Skill-specific NLU processes for this list of skills may be executed for the "give me my weather update" utterance to generate an interpretation of the current utterance. Accordingly, a given input utterance need not be identical to the phraseology of a commonly-used, cached utterance in various examples described herein. Instead, the list of skill-specific NLU processes associated with a semantically similar and cached utterance may be retrieved from the cache.

As previously described, different NLU processes may be employed for a given utterance. For example, a first NLU process flow may comprise a rule-based heuristic system utilizing knowledge graphs and/or ontological configurations that have been coded in advance. An example of a possible first NLU process flow is described below in reference to FIG. 7. In another example, a contextual carry-over NLU process flow may identify entities (e.g., nouns and/or pronouns) in a given natural language input based on contextual data stored in relation to one or more previous natural language inputs. In various examples, the semantic meaning of a given utterance determined using rule-based heuristic NLU process flow may differ from the semantic meaning of the same utterance determined using the contextual carry-over NLU process flow. In another example, a candidate-based parsing NLU process flow may be used to derive the semantic meaning of particular types of natural language inputs. Candidate-based parsing NLU processing may involve determining named entities (e.g., the names of people, places, and/or entities) included in a natural input and comparing the recognized named entities to a table that includes previously-stored question-and-answer pairs to determine a likely question that is being asked by the user. In various examples, it may be advantageous to perform NLU processing using multiple NLU processes (e.g., including one or more of those NLU processes described above) in case the primary NLU process flow is unable to determine a semantic interpretation of the natural language input. In some other examples, it may be advantageous to perform NLU processing using multiple processes as one or more of the processes may determine a semantic interpretation that is more appropriate for a given utterance relative to the another NLU process flow. As used herein, a "process flow" may refer to one or more computer-executable operations performed in accordance with a given NLU strategy used to derive meaning for particular request data (e.g., for a particular user utterance).

Multiple NLU processes may be executed serially or in parallel for a given natural language input. Parallel processing by each of multiple NLU processes may result in an overall decrease in speech processing latency (e.g., the time between when a user makes a request and when the speech processing system returns a result), as each NLU process flow may perform actions in parallel and the derived meaning of the natural language input may thereby be determined (e.g., selected from among the one or more NLU process flow outputs) more quickly relative to serial processing of each NLU process flow. However, some NLU processes may be unable and/or unlikely to be capable of deriving a semantic interpretation of particular request data. Furthermore, some NLU processes may generate redundant NLU output data (e.g., intent data representing a semantic interpretation of the natural language input) as other NLU processes. Accordingly, executing each NLU processing strategy (e.g., each NLU process flow may represent a different NLU processing strategy) in parallel may result in an increased cost (e.g., in terms of CPU cycles and/or memory usage) for processing a given natural language input, relative to processing the input serially. Described herein are techniques that may be used to reduce the computational burden of NLU processing through the use of a cache to retrieve a shortlist of NLU processes that have historically been used to process a given utterance or a semantically similar utterance. Additionally, use of the various cache-based skill selection techniques described herein may enable various speech processing operations to be completed on resource-constrained systems, such as client devices, instead of on cloud-based backend systems.

The various techniques described herein and speech processing generally may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user request data by outputting content and/or performing one or more other actions, such as initiating communications (e.g., synchronous phone/video calls and/or asynchronous messaging), answering questions, playing music, providing information, calling a taxi, displaying an image, controlling other devices, etc. Generally, input data received by the various speech processing systems and components described herein may comprise natural language input data. Natural language input data may be in the form of audio data representing spoken user request data (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

FIG. 1 is a block diagram illustrating cache-based skill selection for natural language processing, according to various embodiments of the present disclosure. In the example depicted in FIG. 1, audio data 102 representing a user utterance may be received by a speech processing system. Although audio data 102 is depicted and described with respect to FIG. 1, it should be appreciated that any natural language input may be used in accordance with the various techniques described herein. For example, input text data may instead be used in accordance with the various techniques described herein. The speech processing system may include ASR component 150. ASR component 150 may be effective to process the audio data 102 to generate ASR output data 120 (e.g., text data representing the audio data 102 and/or other data associated with the audio data 102 and/or with a user request generally). In at least some examples, ASR output data 120 may be referred to as "ASR data."

ASR output data 120 may be sent to an NLU component 160 for determination of a semantic interpretation of the utterance represented by ASR output data 120. In various examples, a Skill selector 108 may be upstream of the various NLU processes (e.g., first NLU process 104, question and answer ("Q&A") process 103, auxiliary NLU process 114, etc.). Accordingly, prior to processing the ASR output data 120 using one or ore of the NLU processes, the Skill selector 108 may use ASR output data 120 to search a cache for matching ASR output data 120 (e.g., for string data matching the current utterance).

For example, the ASR output data 120 may be text data representing the utterance "What time is it?" Skill selector 108 may search a cache using the text data. If a match is found in the cache that matches the text data "what time is it," values stored in association with the cache entry "what time is it" may be retrieved. The values may be data identifying skills that have been used in the past to process the utterance "what time is it." In an example, the skills may be a "general" skill and a "time" skill. Thereafter, instead of executing a comprehensive list of NLU processes (e.g., for each applicable skill and/or category of skill), only the NLU processes applicable to the skills retrieved from the cache may be executed.

In the current example, first NLU process 104 may be associated with the general skill and auxiliary NLU process 114 may be associated with the "time" skill. Accordingly, in the current example, only first NLU process 104 and auxiliary NLU process 114 may be executed to determine intent data for the current ASR output data 120 representing the utterance "what time is it." Other NLU processes (e.g., Q&A process flow, etc.) may not be executed, resulting in computational savings.

In some examples, instead of being executed upstream relative to the various NLU processes, the Skill selector 108 may be executed as part of one or more of the NLU processes. For example, first NLU process 104 may comprise a plurality of NLU processes for first party skills (e.g., skills developed and/or controlled by an entity associated with the speech processing platform being used), while auxiliary NLU process 114 may be associated with third party skills (e.g., skills developed by one or more other entities). In this context, the Skill selector 108 may be used to cache a shortlist of skills that were historically used to process various utterances within the first party context, the third party context, the Q&A context, etc.

In the example depicted in FIG. 1, a shortlist of skills may be returned for a particular utterance in response to a cache hit. Thereafter, at action 110 skill-specific NLU models may be executed for the shortlisted skills returned from the cache for the particular utterance (e.g., as represented by the ASR output data 120). The results may include intent data representing semantic interpretations of the ASR output data 120 for each different skill. In various examples, the intent data may be associated with NLU confidence scores indicating a confidence in the output of the particular skill-specific NLU process flow. At action 112 the results of the shortlisted skill-specific NLU processes may be merged (e.g., by eliminating duplicate intents and/or skills that have indicated that they are unable to interpret the current request). The NLU results may be ranked and/or re-ranked on the basis of NLU confidence scores. The merged and re-ranked results may be sent to other NLU processes that are being executed for the current ASR output data 120.

For example, if Q&A process 103 is executing, the merged and/or re-ranked results from first NLU process 104 may be sent to Q&A process 103 for merging with the results of Q&A process 103. However, if Q&A process 103 is not executing for the current ASR output data 120 (e.g., as a result of Q&A process 103 not being among the results of an upstream instantiation of Skill selector 108) the merged and/or re-ranked results from first NLU process 104 may be sent to another NLU process flow that is executing (e.g., auxiliary NLU process 114) for merging with the results generated by the other NLU processes.

In an example embodiment, auxiliary NLU process 114 may be associated with a large number of skills (e.g., skills developed by a large number of unaffiliated developers). Accordingly, the Skill selector 108 may be used to drastically reduce the number of skill-specific NLU processes that are to be executed for the current utterance from potentially tens, hundreds, and/or thousands of different NLU processes to a small number of NLU processes that have been historically used to process utterances identical to the current utterance or semantically similar to the current utterance.

Additionally, in some examples, a machine learned skill shortlister 142 may optionally be executed downstream from the Skill selector 108. For example, data may be retrieved from the cache including the IDs of twenty skills that were previously used to process the current utterance. However, instead of executing skill-specific NLU processes for all twenty skills, skill shortlister 142 may be configured to predict a smaller number of skills to be most likely to correctly interpret and/or process the current utterance. Skill-specific NLU processing for the shortlist of skills output by either Skill selector 108 and/or skill shortlister 142 may be executed at action 144. Thereafter, the results may be merged at action 146 with the results of other NLU processes (e.g., first NLU process 104, Q&A process 103, etc.) to generate NLU output data 152. The NLU output data 152 may represent skill-specific intent data for the utterance and may be ranked in order of confidence scores.

Figure 2:
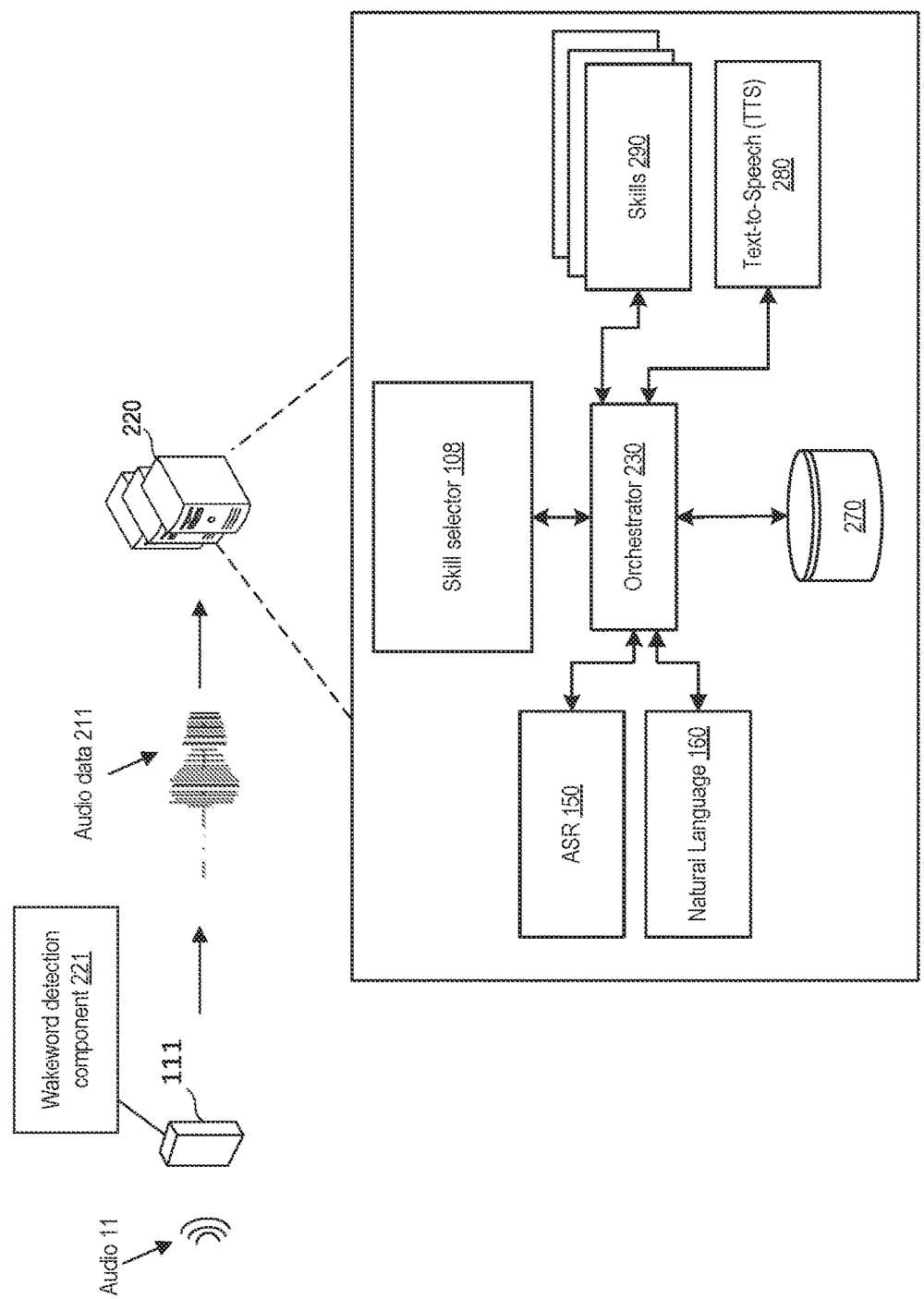
FIG. 2 is a block diagram of various components of a remote system that may be used in accordance with various aspects of the present disclosure.

FIG. 2 is a block diagram of various components of a remote system that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data 120 (e.g., text data representing a current utterance) may be used to search Skill selector 108 for a matching utterance and/or semantically similar utterance stored in a cache. Thereafter, the cache may store skills that were previously-used to process the identical or semantically similar utterance in association with the utterance. The set of skills previously used to process the utterance may be returned. Natural language component 160 may thereafter execute the skill-specific NLU processes for the set of skills (e.g., for the shortlist of skills).

An audio capture component(s), such as a microphone or array of microphones of the device 111, captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin transmitting audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 150. The ASR component 150 transcribes the audio data 211 into text data. The text data output by the ASR component 150 represents one or more than one (e.g., in the form of an N-best list) hypotheses representing speech represented in the audio data 211. The ASR component 150 interprets the speech in the audio data 211 based on a similarity between the audio data 211 and pre-established language models. For example, the ASR component 150 may compare the audio data 211 with models for sounds (e.g., subword units, such as phonemes, etc.) and sequences of sounds to identify words that match the sequence of sounds of the speech represented in the audio data 211. The ASR component 150 sends the text data generated thereby to an NLU component 160, for example via the orchestrator component 230. The text data sent from the ASR component 150 to the NLU component 160 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 160 attempts to make a semantic interpretation of the phrases or statements represented in the text data input therein. That is, the NLU component 160 determines one or more meanings associated with the phrases or statements represented in the text data based on words represented in the text data. The NLU component 160 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 160 may determine an intent that the system establish a two-way communication channel between the device 111 originating the call and a device of the recipient "John." For further example, if the text data corresponds to "tell John I am on my way," the NLU component 160 may determine an intent that the system send a message to a device of the recipient "John," with the message corresponding to "I am on my way." As described herein, in various examples, Skill selector 108 may reduce the number of skill-specific NLU processes that are executed for a particular utterance to those that were previously used to execute an identical or semantically similar utterance.

The NLU component 160 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 160 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
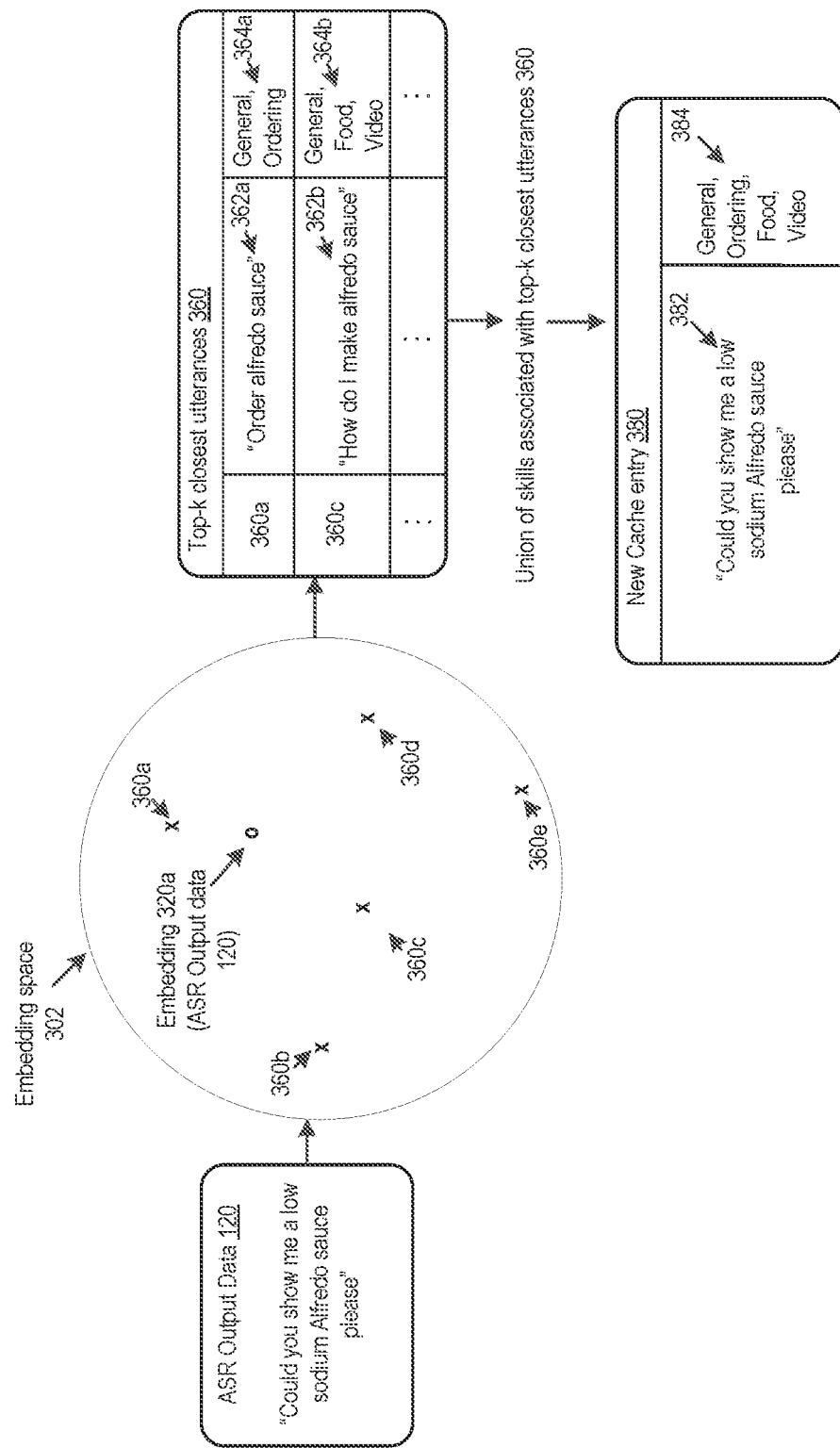
FIG. 3 is a block diagram illustrating the determination of semantically similar utterances for cache-based skill selection, in accordance with various embodiments described herein.

FIG. 3 is a block diagram illustrating the determination of semantically similar utterances for cache-based skill selection, in accordance with various embodiments described herein. ASR output data 120 representing a natural language input (e.g., an utterance or input text) may be received. In the example depicted in FIG. 3, the ASR output data 120 corresponds to the utterance "could you show me a low sodium alfredo sauce please."

In various examples, the ASR output data 120 may not be found in the cache associated with Skill selector 108. The ASR output data 120 (e.g., text representing the utterance) may be input into a language model trained to generate a vector representation of the ASR output data 120 (e.g., n-gram embedding data). For example, the Universal Sentence Encoder (USE) model, a transformer based model (e.g., BERT), a long short term memory (LSTM), and/or other recurrent neural network may be used to generate an embedding vector representing the ASR output data 120 (e.g., a natural language input).

In the example of the USE model, the utterance text is transformed into a 512-dimensional embedding vector representing the input text. USE makes use of a deep averaging network (DAN) encoder. DAN takes the word and bi-gram embeddings $v_w$, from the input text $X=\{w_1 \ldots, w_k\}$, and averages them together. DAN passes the average through a deep feed-forward neural network followed by a softmax classifier to generate the embedding vector ŷ. Advantageously, a DAN model may offer improved compute time that is linear with respect to the length of a sentence relative to transformer models. Equations (1) to (3) below illustrate the generation of the embeddings ŷ. In the equations, W represents a weight matrix and b represents a bias term.

$$z_0 = \frac{1}{|X|} \sum_{w \in X} v_w \quad (1)$$

$$z_i = f(Wi.z_i-1+b_i), i=1 \ldots n \quad (2)$$

$$ŷ = f(Ws.z_n+b) \quad (3)$$

Accordingly, embedding 320a may be generated using the equations described above (or using a different encoder model) to generate embedding 320a representing the natural language input in a multi-dimensional embedding space 302. There may be a plurality of other embeddings (e.g., embeddings 360a, 360b, 360c, 360d, 360e, . . . ) in the embedding space 302, with each of the other embeddings representing a respective natural language input, as encoded by the language model.

A semantic retrieval operation may be performed to determine the top-k closest utterances 360 to the input utterance (e.g., representing by embedding 320a). The top-k closest utterances 360 may be selected from historical data (e.g., utterances processed by the speech processing system within the last day, week, month, 2 hours, etc.). For example, a search index may be generated and used to compare the current embedding (e.g., embedding 320a) to all neighboring embeddings within the embedding space. The search index may be used to find the embedding vectors of embedding space 302 with the largest cosine similarity (or smallest Euclidean distance or other similarity score). Since the embedding vectors may represent the semantic meaning of the utterances, the cosine similarity (or other similarity metric) may represent the semantic similarity between the two utterances (e.g., between the meaning of the two sets of natural language input data). In various examples, the encoding and similarity search may be performed offline in order to populate the cache with a variety of semantically similar variations on the common utterances present in the historical data. Notably, such an approach avoids execution and/or storage of the language model and/or search index during runtime. However, in various other examples, incoming natural language inputs may be processed to determine if a semantically similar phrase is found in the cache, in accordance with the various techniques described herein.

In the example depicted in FIG. 3, the top-k closest utterances 360 to the input text "Could you show me a low sodium Alfredo sauce please" are the utterance 362a ("Order alfredo sauce") represented by embedding 360a, and the utterance 362b ("How do I make alfredo sauce") represented by embedding 360c. Embedding 360a is associated with identifiers (e.g., identifier data) effective to identify the "General" and "Ordering" skills 364a in the cache, indicating that the utterance "Order alfredo sauce" was previously processed by the "General" skill-specific NLU process and the "Ordering" skill-specific NLU process. Similarly, embedding 360c (representing a semantically similar utterance) is associated with identifiers (e.g., identifier data) effective to identify the "General," "Food," and "Video" skills 364b in the cache, indicating that the utterance "How do I make alfredo sauce" was previously processed by the "General" skill-specific NLU process, the "Food" skill-specific NLU process, and the "Video" NLU process.

For the current ASR output data 120, the union of the skills associated with the top-k closest utterances 360 (to the extent the set of skills associated with utterances of the top-k closest utterances 360 are different from one another) may be determined. In the current example, the union of skills comprises the "General," "Ordering," "Food," and "Video" skills. In a runtime example, the skill-specific NLU process flows corresponding to these skills may be used to process the current ASR output data 120. In a different example where the cache is being populated, data 384 identifying these skills (e.g., "General," "Ordering," "Food," and "Video") may be stored as a new cache entry 380 cache value in association with the key 382 "Could you show me a low sodium Alfredo sauce please." In various examples, a new cache entry 380 may be generated only where the natural language input (e.g., "Could you show me a low sodium Alfredo sauce please") has been received greater than or equal to a threshold number of times during a particular past time period (e.g., ≥5 times in the past week, 3 times in the past day, 4 times in the past 3 days, etc.). The threshold number may be a threshold number of times used to determine whether to incorporate new natural language input data (e.g., text data representing a user utterance) into a cache or other storage component.

Figure 4:
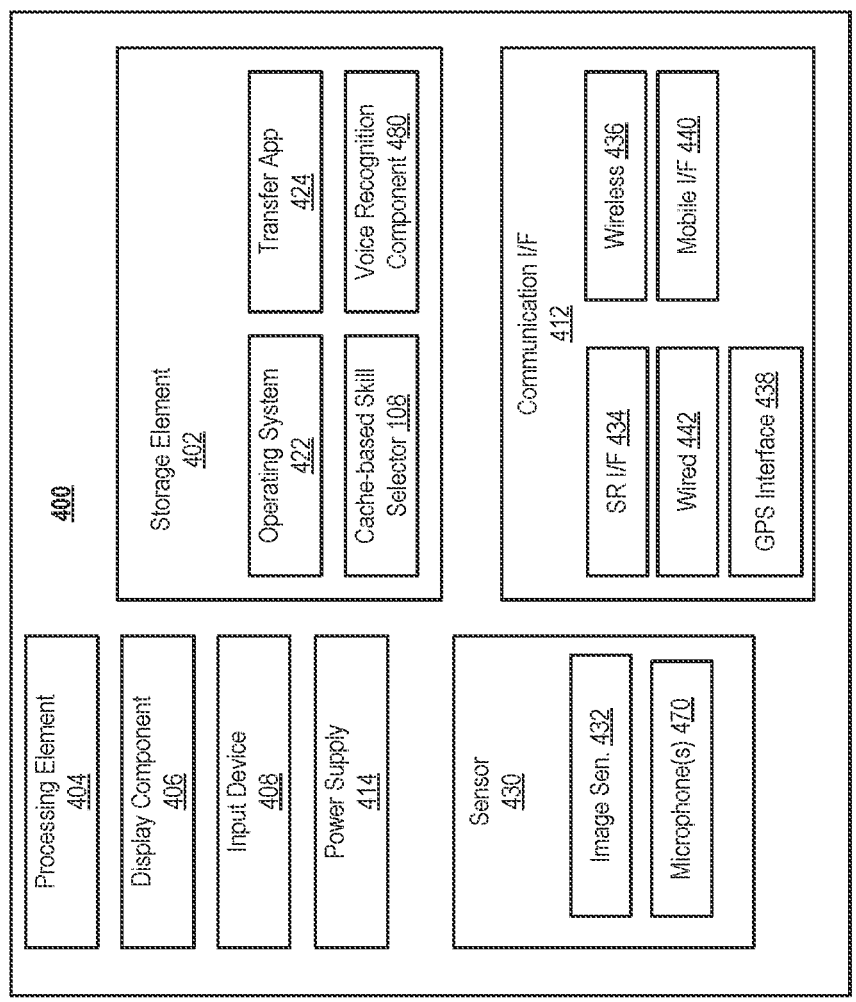
FIG. 4 is a block diagram showing an example architecture of a speech processing-enabled device that may be used in accordance with various embodiments described herein.

FIG. 4 is a block diagram showing an example architecture 400 of a computing device that may be used to implement, at least in part, a speech processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise the Skill selector 108 that may store key value pairs comprising natural language data (e.g., string data representing past natural language inputs) as keys in association with data identifying skills used to process those domains as values.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
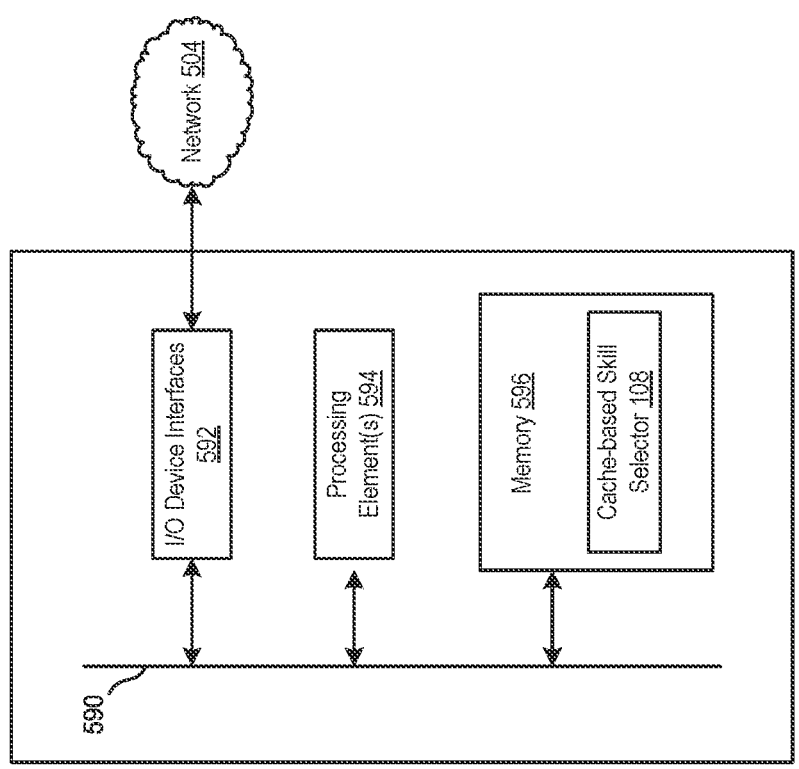
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 160, such as machine learned models associated with various NLU process flows (described in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, Skill selector 108 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models, and/or the NLU process flow result data, ER result data, and/or other intermediate result data generated by one or more of the NLU process flows may be stored and/or cached in memory 596.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
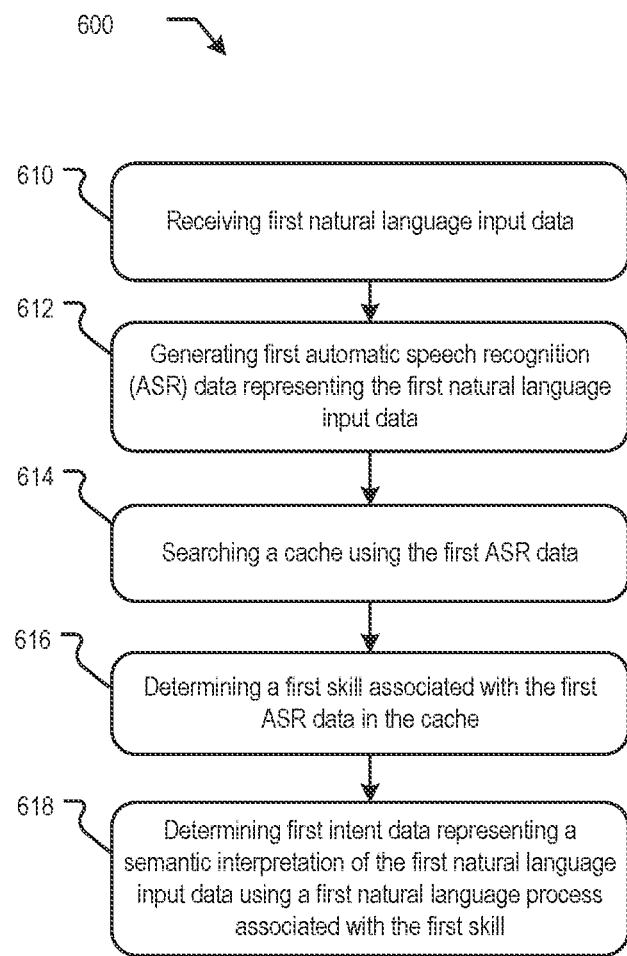
FIG. 6 depicts a flow chart showing an example process for cache-based skill selection for natural language processing, in accordance with various aspects of the present disclosure.

FIG. 6 depicts a flow chart showing an example process 600 for cache-based skill selection for natural language processing, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which first natural language input data may be received. In various examples, the input data may comprise audio data representing a user utterance and/or text data representing input user text. In some examples, the input data, in whatever form, may represent a user's question and/or command for processing by a speech processing system.

Processing may continue from action 610 to action 612, at which first ASR data may be generated representing the first natural language input data received at action 610. In some examples, additional the first ASR data may be text data. In some other examples, other ASR data may be generated in addition to the text data (e.g., ASR confidence scores and/or multiple ASR text hypotheses for the input data).

Processing may continue from action 612 to action 614, at which a cache (e.g., a cache of Skill selector 108) may be searched using the first ASR data. For example, the cache may be searched to determine if a key matches the search term (e.g., the first ASR data). In various examples, a cache table may be used to perform the cache search. The cache may store ASR data (e.g., text data representing past utterances and/or other past natural language inputs into a speech processing system). The cached ASR data keys may be associated with values stored in the cache as key-value pairs. The values may comprise a list of speech processing skills previously used to process the respective ASR data. For example, the ASR data "Play Frozen" may be associated in the cache with a video player skill and a music player skill, as each of these skills may have been used in the past to process the request "Play Frozen."

Processing may continue to action 616, at which a first skill associated with the first ASR data in the cache may be determined. As previously described, the skills stored in association with the first ASR data may be those skills that were previously used to process the first ASR data. Processing may continue to action 618, at which first intent data representing a semantic interpretation of the first natural language input data may be determined using a first NLU process associated with the first skill. In various examples, instead of executing all NLU processes (e.g., as might be performed for a never-before-seen and/or un-cached utterance) only those skill-specific NLU processes that are associated with the skills returned from the cache may be executed. In various further examples, instead of caching data identifying skills previously used to process the ASR data, the intent data previously generated as a result of skill-specific NLU processes may be cached and retrieved. In some other examples, a particular named entity recognizer model that was previously used to process identical or semantically similar ASR data may be cached.

In various examples, some skills may use finite state transducers (FSTs) that map ASR output data to the skill when a particular phrase is used. For example, a question and answer skill (e.g., a knowledge base skill) may use an FST to create a mapping between natural language inputs that begin with "what is . . . " and the skill. However, there are certain instances when such "greedy" FST mappings may not result in an optimal user experience. For example, if the user is saying, "what is the pizza I should order," a food-ordering skill may be more appropriate to process the request relative to the question and answer skill. A user may interrupt processing by the speech processing system until the desired action is performed. Accordingly, the food-ordering skill may ultimately be used to process the "what is the pizza I should order" natural language input. As such, the food-ordering skill may be stored in the cache by the Skill selector 108. Accordingly, the Skill selector 108 may provide better user experiences when skills use FSTs to capture large numbers of natural language inputs.

In various further examples, the caches described herein may be associated with a particular account (e.g., a user account) and/or with a particular device. Accordingly, the caches may be personalized and/or tailored for specific applications. For example, a device with a screen may have a cache that persists video skills whereas a screenless device may not persist video skills in the cache, as users would be unlikely to request video playback on devices that do not include a display. Similarly, a cache may persist historical skill processing data particular to an account, so that the most relevant experiences to that account may be surfaced in the future.

Figure 7:
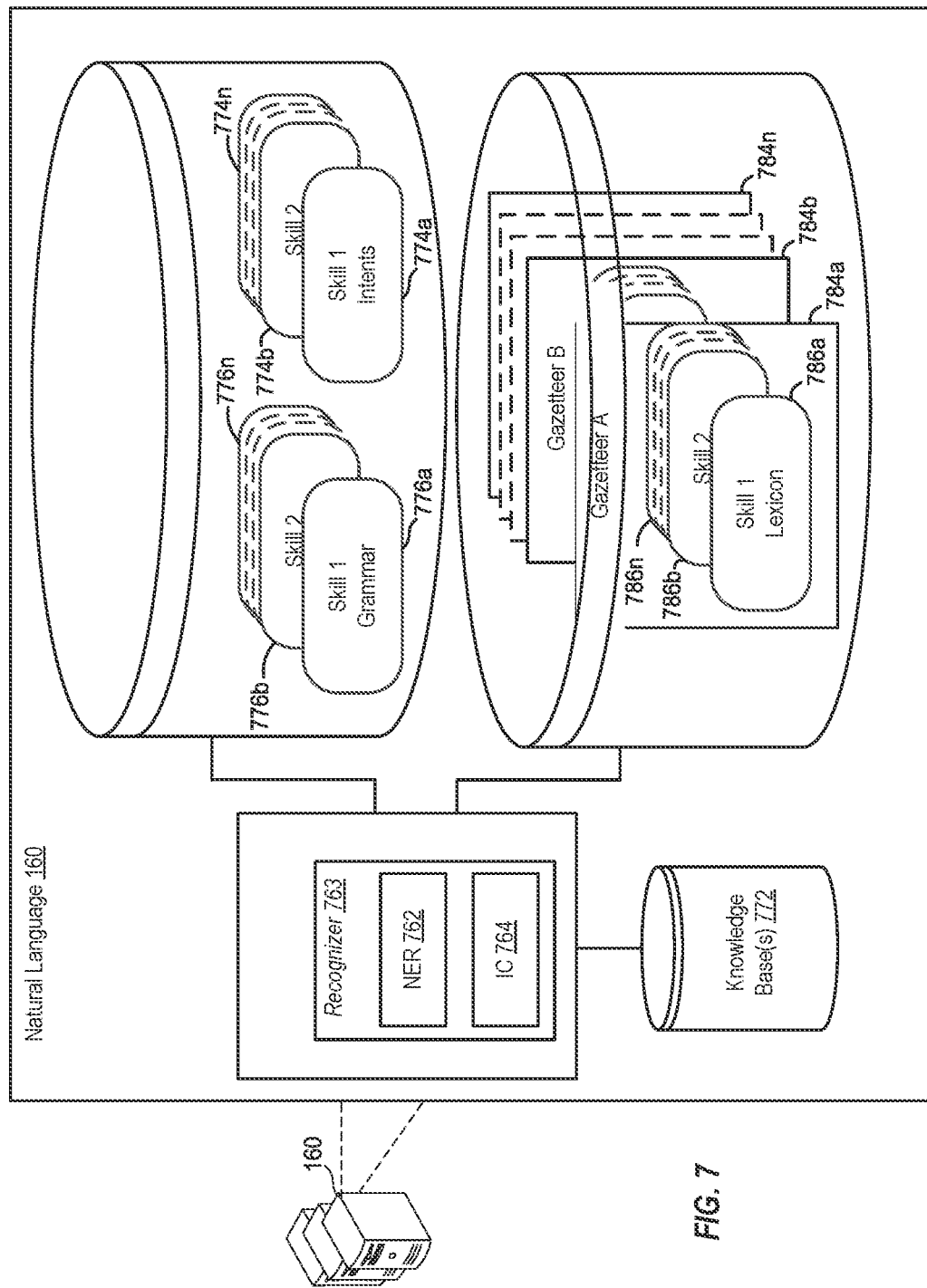
FIG. 7 is a conceptual diagram illustrating how natural language understanding processing is performed according to embodiments of the present disclosure.

FIG. 7 illustrates how NLU processing for an example NLU process flow may be performed on text data and/or other ASR output data. One or more of the techniques described below in reference to FIG. 7 may represent various techniques used during first NLU process 104, Q&A process 103, auxiliary NLU process 114, etc. Generally, the NLU component 160 attempts to make a semantic interpretation of text data input thereto. That is, the NLU component 160 determines the meaning behind text data based on the individual words and/or phrases represented therein. The NLU component 160 interprets text data to derive an intent of the user as well as pieces of the text data that allow a device (e.g., a speech processing enabled device, the speech processing system 100, etc.) to complete that action.

The NLU component 160 may process text data including several ASR hypotheses. The NLU component 160 may process all (or a portion of) the ASR hypotheses input therein. Even though the ASR component 150 may output multiple ASR hypotheses, the NLU component 160 may be configured to only process with respect to the top scoring ASR hypothesis. Additionally, as described herein, the ASR component 150 may generate confidence scores associated with each hypothesis.

The NLU component 160 may include one or more recognizers 763. Each recognizer 763 may be associated with a different skill. Each recognizer 763 may process with respect to text data input to the NLU component 160. Each recognizer 763 may operate at least partially in parallel with other recognizers 763 of the NLU component 160. As previously described, in some examples, a previously-used recognizer may be stored in a cache in association with input ASR data so that the recognizer may again be used when identical or semantically similar ASR input data is received.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill. The NER component 762 (or other component of the NLU component 160) may also determine whether a word refers to an entity whose identity is not explicitly mentioned in the text data, for example "him," "her," "it" or other anaphora, exophora or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or speech processing enabled device. For example, a Gazetteer A (784a) includes skill-indexed lexicon 786a to 786n. A user's music skill lexical information might include album titles, artist names, and song names, for example, whereas a user's contact list skill lexical information might include the names of contacts. Since every user's music collection and contact list is presumably different, this personalized information improves entity resolution. When a cache is used to identify particular skills for ASR input data, the gazetteers related to the cached skills may be loaded into memory.

An NER component 762 applies grammar models 776 and lexicon 786 to determine a mention of one or more entities in text data. In this manner, the NER component 762 identifies "slots" (corresponding to one or more particular words in text data) that may be used for later processing. The NER component 762 may also label each slot with a type (e.g., noun, place, city, artist name, song name, etc.). As previously described, each recognizer 763 may generate confidence scores associated with each named entity and/or with each match of a named entity. In at least some examples, the NER component 762 may compute the ER data that may be used by one or more of the NLU process flows described above.

Each grammar model 776 includes the names of entities (i.e., nouns) commonly found in speech about the particular skill to which the grammar model 776 relates, whereas the lexicon 786 is personalized to the user and/or a speech processing enabled device from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb, which an IC component 764 may determine corresponds to a <PlayMusic> intent. At this stage, no determination has been made as to the meaning of "mother's little helper" and "the rolling stones," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by the rolling stones," after failing to determine an album name or song name called "songs" by "the rolling stones," the NER component 762 may search the database for the word "songs." In the alternative, generic words may be checked before the gazetteer information, or both may be tried, potentially producing two different results.

An NER component 762 may tag text data to attribute meaning thereto. For example, an NER component 762 may tag "play mother's little friend by the singing stones" as: {skill} Music, {intent}<PlayMusic>, {artist name} singing stones, {media type} SONG, and {song title} mother's little friend. For further example, the NER component 762 may tag "play songs by the singing stones" as: {skill} Music, {intent}<PlayMusic>, {artist name} singing stones, and {media type} SONG.

The NLU component 160 may generate cross-skill N-best list data, which may include a list of NLU hypotheses output by each recognizer 763. A recognizer 763 may output tagged text data generated by an NER component 762 and an IC component 764 operated by the recognizer 763, as described above. Each NLU hypothesis including an intent indicator and text/slots may be grouped as an NLU hypothesis represented in cross-skill N-best list data. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Lady Baba SongName: Poker Head

[0.95] Intent: <PlayVideo> ArtistName: Lady Baba VideoName: Poker Head

[0.01] Intent: <PlayMusic> ArtistName: Lady Baba AlbumName: Poker Head

[0.01] Intent: <PlayMusic> SongName: PokerHead

Figure 8:
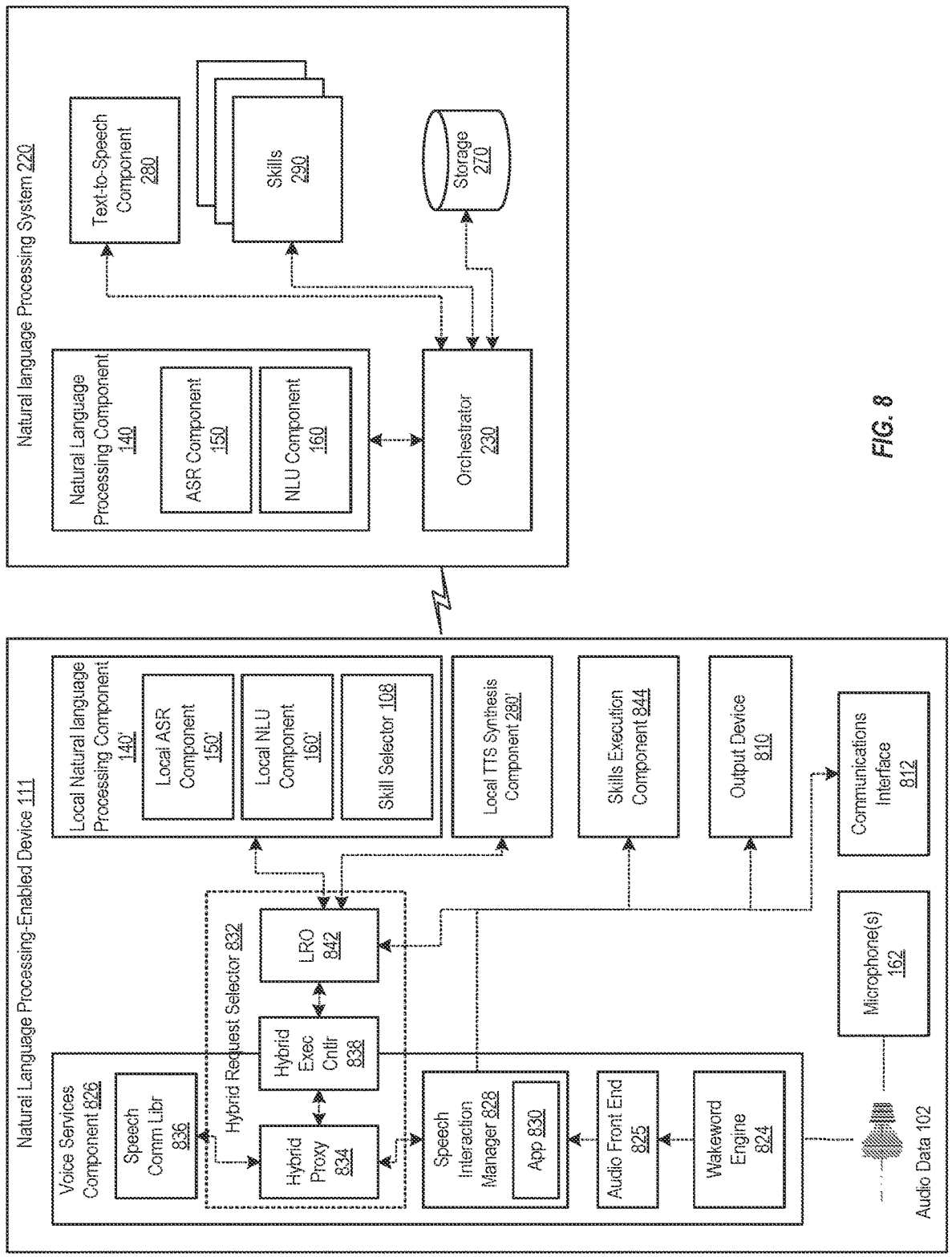
FIG. 8 is a block diagram illustrating a speech processing-enabled device and a speech processing management system, in accordance with embodiments of the present disclosure.

FIG. 8 is a block diagram illustrating a natural language processing-enabled device 111 and a natural language processing system 220, in accordance with embodiments of the present disclosure. In various examples, device 111 may be a natural language processing-enabled device and may include microphones (e.g., far-field microphone arrays) used to transform audio into electrical signals. Natural language processing may then be performed, either locally by the natural language processing-enabled device 111, by one or more other computing devices communicating with the natural language processing-enabled device 111 over a network (e.g., natural language processing system 220), or by some combination of the natural language processing-enabled device 111 and the one or more other computing devices. In various examples, natural language processing-enabled device 111 may include and/or may be configured in communication with output device(s) 810 (e.g., speakers and/or displays) effective to output information obtained in response to a user's spoken request or command, or to output content that may be of interest to one or more users. As used herein, a display of natural language processing-enabled device 111 refers to a display effective to output graphics such as images and/or video. Further, as used herein, a displayless device refers to a device that does not include a display that is effective to render graphical images or text.

In various examples, the device 111 may include the Skill selector 108 that may be used to retrieve historical skills used to process a given ASR input (and/or a semantically similar ASR input), as described above. Using a cache as described herein may allow for increased speech processing functionality to occur on the device 111 and reduce or eliminate the need to send data over a network to one or more remote computing devices since the cache may reduce the number of models and/or NLU interpretations that are generated for a given natural language input.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 162 to capture utterances and convert them into digital audio data 102, the natural language processing-enabled device 111 may additionally, or alternatively, receive audio data 102 (e.g., via the communications interface 812) from another device in the environment. In various examples, the natural language processing-enabled device 111 may capture video and/or other image data using a camera. Under normal conditions, the natural language processing-enabled device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 102 from the natural language processing-enabled device 111, to recognize speech in the received audio data 102, and to perform functions in response to the recognized speech. In some embodiments, these functions involve sending a command, from the natural language processing system 220, to the natural language processing-enabled device 111 to cause the natural language processing-enabled device 111 to perform an action, such as output an audible response to the user speech via output device 810 (e.g., one or more loudspeakers). Thus, under normal conditions, when the natural language processing-enabled device 111 is able to communicate with the natural language processing system 220 over a WAN (e.g., the Internet), some or all of the functions capable of being performed by the natural language processing system 220 may be performed by sending a command over a WAN to the natural language processing-enabled device 111, which, in turn, may process the command for performing actions. For example, the natural language processing system 220, via a remote command that is included in remote response data, may instruct the natural language processing-enabled device 111 to output an audible response (e.g., using a local text-to-speech (TTS) synthesis component 280) to a user's question, to output content (e.g., music) via output device 810 (e.g., one or more loudspeakers) of the natural language processing-enabled device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the natural language processing-enabled device 111 may include a local voice services component 826. When a user utterance including the wakeword is captured by the microphone 162 of the natural language processing-enabled device 111, the audio data 102 representing the utterance is received by a wakeword engine 824 of the voice services component 826. The wakeword engine 824 may be configured to compare the audio data 102 to stored models used to detect a wakeword (e.g., "Computer") that indicates to the natural language processing-enabled device 111 that the audio data 102 is to be processed for determining an intent. Thus, the wakeword engine 824 is configured to determine whether a wakeword is detected in the audio data 102, and, if a wakeword is detected, the wakeword engine 824 can proceed with routing the audio data 102 to an audio front end (AFE) 825 (sometimes referred to as an acoustic front end (AFE)) of the voice services component 826. If a wakeword is not detected in the audio data 102, the wakeword engine 824 can refrain from sending the audio data 102 to the AFE 825, thereby preventing the audio data 102 from being further processed. The audio data 102 can be discarded.

The AFE 825 is configured to transform the audio data 102 received from the wakeword engine 824 into data for processing by a suitable ASR component and/or NLU component. The AFE 825 may reduce noise in the audio data 102 and divide the digitized audio data 102 into frames representing a time intervals for which the AFE 825 determines a number of values, called features, representing the qualities of the audio data 102, along with a set of those values, called a feature vector, representing the features/qualities of the audio data 102 within the frame. Many different features may be determined, and each feature represents some quality of the audio data 102 that may be useful for ASR processing and/or NLU processing. A number of approaches may be used by the AFE 825 to process the audio data 102, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 102. Beamforming can be used to distinguish between the directions from which speech and noise originate. Accordingly, the microphones 162 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 102, used by the AFE 825 in beamforming, may be determined based on results of the wakeword engine 824's processing of the audio data 102. For example, the wakeword engine 824 may detect the wakeword in the audio data 102 from a first microphone 162 at time, t, while detecting the wakeword in the audio data 102 from a second microphone 162 a millisecond later in time (e.g., time, t+1 millisecond), and so on and so forth, for any suitable number of audio signals corresponding to multiple microphones 162 in a microphone array.

A speech interaction manager (SIM) 828 of the voice services component 826 may receive the audio data 102 that has been processed by the AFE 825. The SIM 828 may manage received audio data 102 by processing request data and non-speech noise or sounds as events, and the SIM 828 may also manage the processing of commands that are used to respond to the user speech or non-speech noise or sounds (e.g., by controlling the action(s) of the natural language processing-enabled device 111). The SIM 828 may include one or more client applications 830 for performing various functions at the natural language processing-enabled device 111.

A hybrid request selector component 832 of the natural language processing-enabled device 111 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 220. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 220 can be sent to the HEC 838 using the HP 834, which sits in the path between the SCL 836 and the SIM 828. The HP 834 may also be configured to allow audio data 102 received from the SIM 828 to pass through to the natural language processing system 220 (via the SCL 836) while also receiving (e.g., intercepting) this audio data 102 and sending the received audio data 102 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 140' (sometimes referred to as a "natural language processing component," a "spoken language understanding (SLU) component," a "speech engine," or an "engine") is configured to process audio data 102 (e.g., audio data 102 representing user speech, audio data 102 representing non-speech noise or sounds, etc.). In some embodiments, the hybrid request selector component 832 may further include a local request orchestrator component (LRO) 842. The LRO 842 is configured to notify the local natural language processing component 140' about the availability of new audio data 102 that represents user speech, and to otherwise initiate the operations of the local natural language processing component 140' when new audio data 102 becomes available. In general, the hybrid request selector component 832 may control the execution of the local natural language processing component 140', such as by sending "execute" and "terminate" events/instructions to the local natural language processing component 140'. An "execute" event may instruct the local natural language processing component 140' to continue any suspended execution based on audio data 102 (e.g., by instructing the local natural language processing component 140' to execute on a previously-determined intent in order to generate a command). Meanwhile, a "terminate" event may instruct the local natural language processing component 140' to terminate further execution based on the audio data 102, such as when the natural language processing-enabled device 111 receives command data from the natural language processing system 220 and chooses to use that remotely-generated command data.

The LRO 842 may interact with a skills execution component 844 that is configured to receive intent data output from the local natural language processing component 140' and to execute a skill based on the intent.

To illustrate how the natural language processing-enabled device 111 can operate at runtime, consider an example where a user utters an expression, such as "Computer, turn off the kitchen lights." The audio data 102 is received by the wakeword engine 824, which detects the wakeword "Computer," and forwards the audio data 102 to the SIM 828 via the AFE 825 as a result of detecting the wakeword. The SIM 828 may send the audio data 102 to the HP 834, and the HP 834 may allow the audio data 102 to pass through to the natural language processing system 220 (e.g., via the SCL 836), and the HP 834 may also input the audio data 102 to the local natural language processing component 140' by routing the audio data 102 through the HEC 838 of the hybrid request selector 832, whereby the LRO 842 notifies the local natural language processing component 140' of the incoming audio data 102. At this point, the hybrid request selector 832 may wait for response data from the natural language processing system 220 and/or the local natural language processing component 140'.

The local natural language processing component 140' is configured to receive the audio data 102 from the hybrid request selector 832 as input, to recognize speech (and/or non-speech audio events) in the audio data 102, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 140' may include an automatic speech recognition (ASR) component 150' that is configured to perform ASR processing on the audio data 102 to convert the audio data 102 into text data (sometimes referred to herein as "ASR text data," an "ASR result", or "ASR data"). ASR transcribes audio data 102 into text data representing the words of the user speech contained in the audio data 102. A spoken utterance in the audio data 102 can be input to the local ASR component 150', which then interprets the utterance based on the similarity between the utterance and pre-established language models available to the local natural language processing component 140'. In some embodiments, the local ASR component 150' outputs the most likely text recognized in the audio data 102, or multiple hypotheses in the form of a lattice or an N-best list with individual hypotheses corresponding to confidence scores or other scores (such as probability scores, etc.). In some embodiments, the local ASR component 150' is customized to the user (or multiple users) who created a user account to which the natural language processing-enabled device 111 is registered. For instance, the language models (and other data) used by the local ASR component 150' may be based on known information (e.g., preferences) of the user, and/or on a history of previous interactions with the user.

The local natural language processing component 140' may also include a local NLU component 160' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 160' takes textual input (such as text data generated by the local ASR component 150') and attempts to make a semantic interpretation of the ASR text data.

Natural Language Processing System

In other situations, the natural language processing-enabled device 111 may send the audio data 102 to the natural language processing system 220 for processing. As described above, the natural language processing-enabled device 111 may capture audio using the microphone 162, and send audio data 102 (e.g., representing a spoken user request), corresponding to the captured audio, to the natural language processing system 220. The natural language processing-enabled device 111 may include a wakeword detection component that detects when input audio includes a spoken wakeword, and when the wakeword is detected, the audio data 102 is sent by the natural language processing-enabled device 111 to the natural language processing system 220.

Upon receipt by the natural language processing system 220, the audio data 102 may be sent to an orchestrator component 230. The orchestrator component 230 may include memory and logic that enables the orchestrator component 230 to send various pieces and forms of data to various components of the system.

Similar to the operation described above with respect to the local natural language processing component 140' of the natural language processing-enabled device 111, the orchestrator component 230 may send the audio data 102 to a natural language processing component 140. An ASR component 150 of the natural language processing component 140 transcribes the audio data 102 into one or more hypotheses representing speech contained in the audio data 102. The natural language processing component 140 interprets the speech in the audio data based on a similarity between the characteristics of the audio data corresponding to the speech and pre-established language models. For example, the natural language processing component 140 may compare the audio data 102 with models for sounds (e.g., subword units such as phonemes) and sequences of sounds to identify words that match the sequence of sounds in the speech represented in the audio data 102. The natural language processing component 140 may send text data generated thereby to an NLU component 160 of the natural language processing component 140. The text data output by the natural language processing component 140 may include a top scoring hypothesis of the speech represented in the audio data 102 or may include an N-best list including a group of hypotheses of the speech represented in the audio data 102, and potentially respective scores ASR processing confidence scores.

The NLU component 160 attempts to make a semantic interpretation of the phrases or statements represented in the text data input therein. That is, the NLU component 160 determines one or more meanings associated with the phrases or statements represented in the text data based on individual words represented in the text data. The NLU component 160 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical Artist]", the NLU component 160 may determine the user intended to invoke a music playback intent to play the identified album.

The natural language processing system 220 may include a non-transitory computer-readable memory storage 270, storing various instructions for operation of the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the natural language processing-enabled device 111 described herein may be implemented in software, hardware, firmware, or some combination thereof.

The natural language processing system 220 may reside on natural language processing-enabled device 111, in a cloud computing environment, or some combination thereof. For example, the natural language processing-enabled device 111 may include computing equipment, some portion of which is configured with some or all of the components or functionality of natural language processing system 220 and another portion of which is configured with some or all of the components or functionality of computing device(s) used in natural language processing system 220. The natural language processing-enabled device 111 may then perform a variety of functions on its own (such as when remote communications are unavailable), and/or may communicate (when capable) with computing device(s) and/or the natural language processing system 220 to perform other functions. Alternatively, all of the functionality may reside on the natural language processing-enabled device 111 or remotely.

Figure 9:
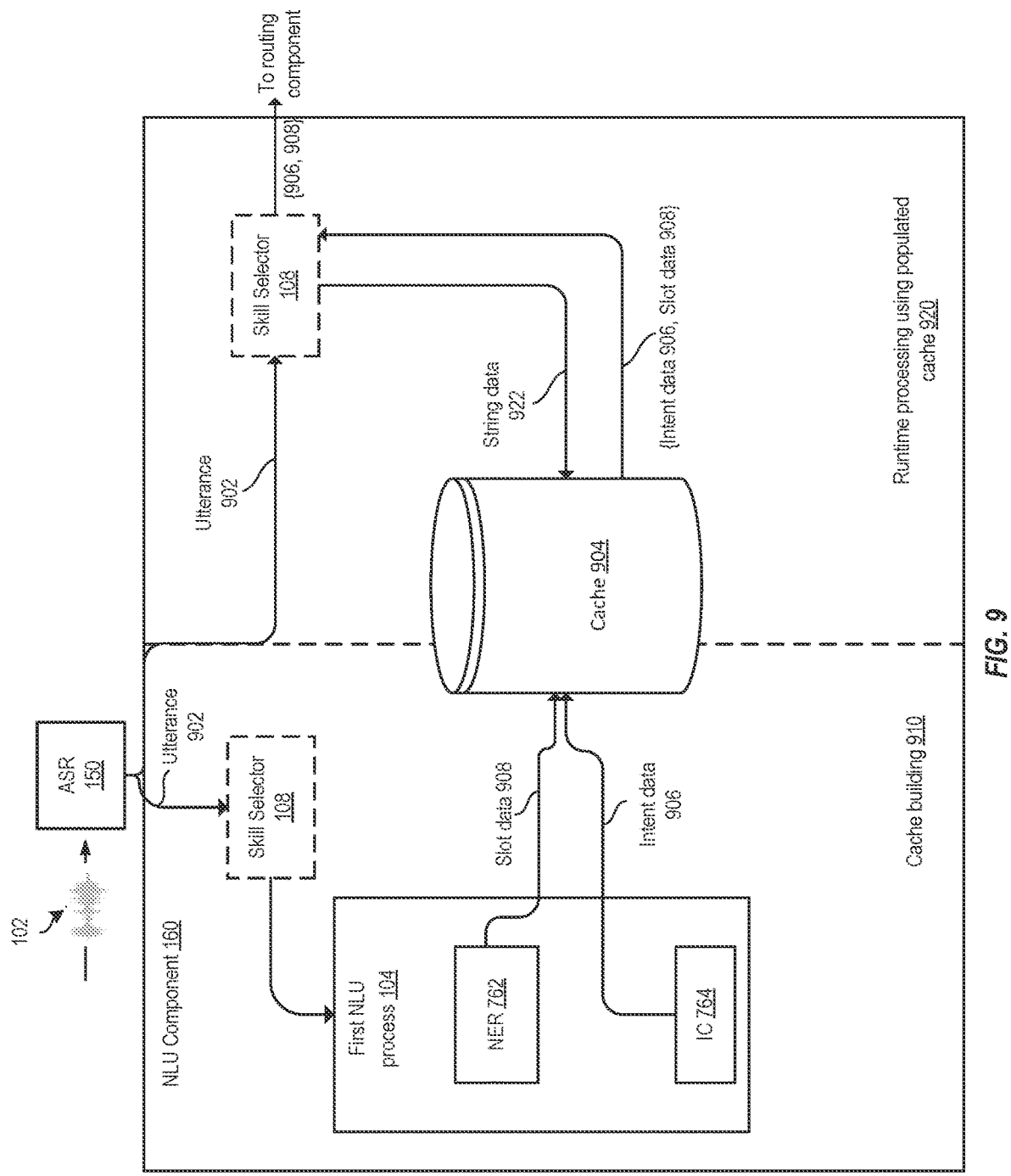
FIG. 9 is a block diagram illustrating cache-based intent determination and cache-based slot data determination, in accordance with various aspects of the present disclosure.

FIG. 9 is a block diagram illustrating cache-based intent determination and cache-based slot data determination, in accordance with various aspects of the present disclosure. In various examples, an utterance 902 (e.g., ASR output data representing a user utterance) may be output by ASR component 150 and may be sent to skill selector 108. As previously described, skill selector 108 may search a storage component (e.g., cache 904) using string data representing the utterance 902 to see if the utterance 902 is represented in the storage component.

Skill selector 108 may determine that utterance 902 is represented in the cache (e.g., that the string data is found in the cache 904) and may determine identifier data identifying a domain previously used to process the same utterance (e.g., utterance 902). For example, the utterance 902 may be the user request "Play Happiness." Skill selector 108 may search cache 904 using the string data "play happiness" as a search input. The string data "play happiness" may be stored in cache 904 in association with identifier data identifying that a movie skill was previously used to process an identical utterance (e.g., a previous request from a user to "play happiness"). Accordingly, skill selector 108 may send the utterance 902 (e.g., text data or other natural language input representing the utterance 902) to first NLU process 104, which may be a skill-specific NLU process for the movie skill previously used to process the identical utterance.

As previously described above in reference to FIG. 7, NER component 762 may determine a portion of the utterance 902 that corresponds to a named entity that may be applicable to processing performed by the relevant skill. Named entity data may be referred to as slot data 908. In the current example, a movie may be entitled "Happiness." Accordingly, NER component 762 may determine the slot data "Happiness." As part of cache-building 910 (e.g., a cache populating procedure), the slot data 908 (e.g., string data—"Happiness") may be stored in cache 904 (or another storage component) in association with the string data representing the utterance 902 and in association with the identifier data identifying the movie skill (and/or the first NLU process 104 (e.g., a movie skill specific NLU process).

Similarly, intent classification IC component 764 may determine a semantic meaning of the utterance 902. The semantic meaning of the utterance may be represented as intent data. For example, for the utterance "Play Happiness," IC component 764 may determine that the play movie intent is applicable. The intent data 906 representing the identified intent (e.g., play movie) may be stored in the cache 904 in association with the string data representing the utterance 902, the slot data 908 (e.g., identifying the named entity—"Happiness"), and in association with the identifier data identifying the movie skill (and/or the skill-specific NLU process).

To the right of the dashed line in FIG. 9, an example of runtime processing using populated cache 920 is illustrated. Upon receipt of an identical utterance 902 (e.g., "Play Happiness"), skill selector 108 may use the string data 922 (e.g., "play happiness") as a search input used to search cache 904. In this example, the search may return not only the identifier data representing the skill-specific NLU process previously used to process utterance 902 (e.g., the movie skill NLU process (first NLU process 104), but also the previously-determined slot data 908 (e.g., the movie title "Happiness") and the previously-determined intent data 906 (e.g., the play movie intent). Accordingly, since the intent data 906 and the slot data 908 have previously been cached, it may be unnecessary to execute the first NLU process 104. Instead, the intent data 906 and slot data 908 may be sent directly to a routing component that may select the particular skill to process the action (e.g., the movie player skill that may process the intent data 906 and slot data 908 to play the movie entitled "Happiness"). Advantageously, retrieving the previously-determined intent data 906 and/or slot data 908 may conserve compute cycles as the NLU models typically used to determine such data need not be executed. Additionally, retrieving intent data 906 and/or slot data 908 from the cache 904 may reduce latency as large neural networks (or other machine learning models) typically used to compute such data need not be loaded into memory and executed.

Although in the example depicted in FIG. 9 both slot data 908 and intent data 906 are cached in cache 904, in various other embodiments intent data 906 or slot data 908 may be cached. For example, a speech processing system may be executing on a client device at the edge of a distributed network (e.g., device 111 of FIG. 8). Such edge-based systems may be resource-constrained relative to the compute power and/or memory resources available in some backend systems (e.g., executing in data centers). There may be a large number of named entities associated with a particular skill. For example, for a music skill there may be millions of different song titles. It may be infeasible or impractical to store such a large number of song titles in a cache on the edge-based device. Accordingly, in an example, intent data may be cached in such a device, but the named entity data (e.g., slot data) may be either cached remotely or may be determined by a remote, backend system on an ad hoc basis.

Figure 10:
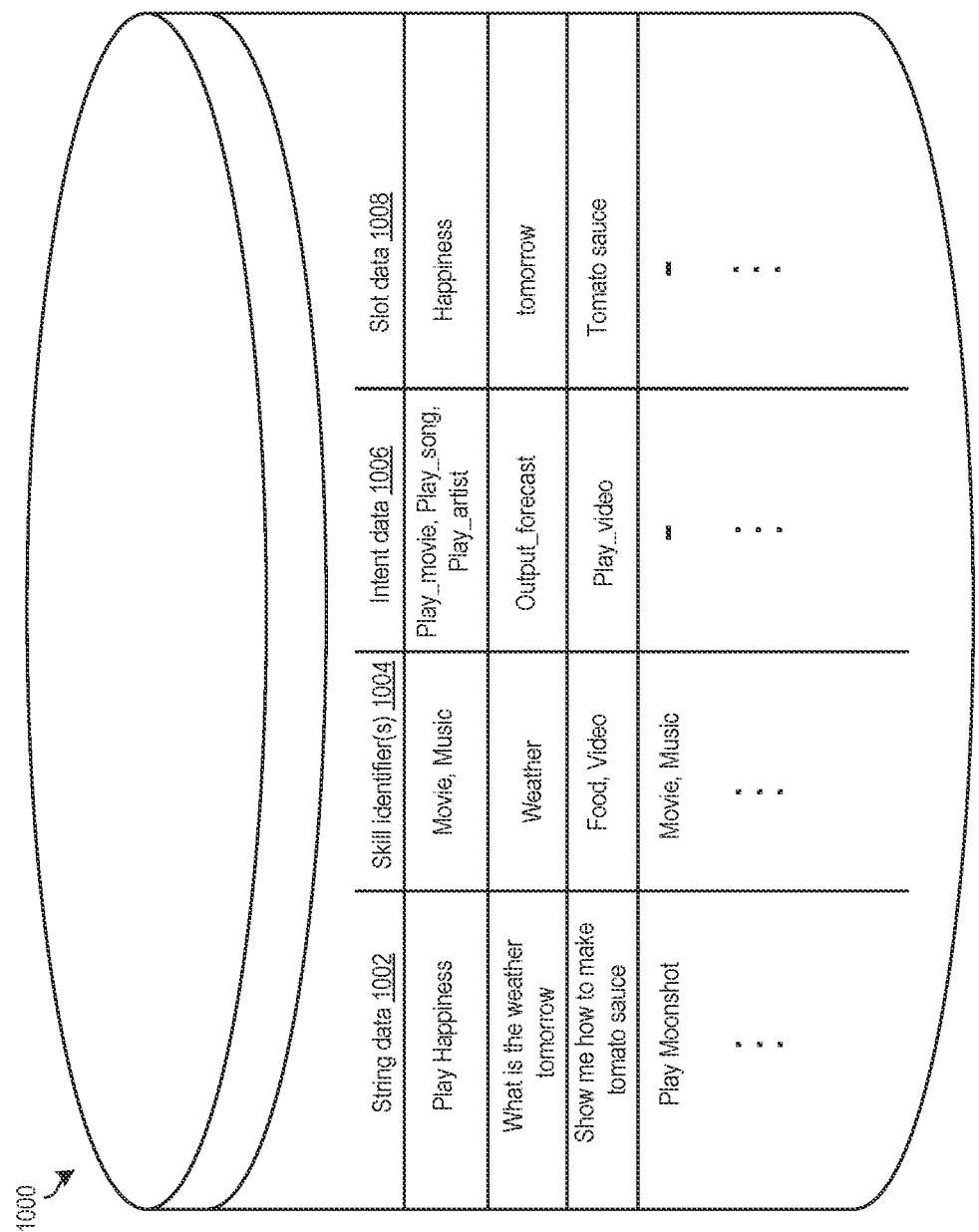
FIG. 10 is a diagram illustrating an example storage component that may be used in accordance with various aspects of the present disclosure.

FIG. 10 is a diagram illustrating an example storage component 1000 that may be used in accordance with various aspects of the present disclosure. In various examples, storage component 1000 may be an L1 cache, an L2 cache, an L3 cache, other non-transitory computer-readable memory, and/or some combination thereof.

In the example storage component 1000 depicted in FIG. 10, string data 1002 is stored that represents various utterances received by the skill selector 108 (FIG. 1). In various examples, instead of string data other representations of the utterances may be used (e.g., numerical representations, etc.). Storage component 1000 also includes fields for skill identifiers 1004, intent data 1006, and slot data 1008. Skill identifiers 1004 may be identifier data effective to identify skills (or skill-specific NLU processes) that have previously been used to process the relevant string data (or other utterance representation). Intent data 1006 may represent the intent(s) previously determined using the skill-specific NLU processes for the particular utterances. Similarly, slot data 1008 may represent named entities and/or other slot data determined for the particular utterance.

In various examples, some entries (e.g., where a row corresponds to an entry) in the storage component 1000 may have less than a complete list of values for every field. For example, for the utterance "Play Moonshot," there may currently be no values stored in the intent data 1006 and slot data 1008 fields. Accordingly, if an identical utterance ("Play Moonshot") is received, the movie and music skill identifier(s) 1004 may be retrieved, enabling the speech processing system to only execute the skill-specific NLU processes for these two skills (rather than a potentially much larger number of NLU processes). The intent data and/or slot data determined during the skill-specific NLU processes (e.g., the movie skill-specific NLU process and/or the music skill-specific NLU process) may optionally be stored in the appropriate fields in the storage component 1000 upon determination (e.g., in order to update the cache).

Conversely, other utterances may be associated with a full complement of string data 1002, skill identifier(s) 1004, intent data 1006, and slot data 1008. Accordingly, upon receiving an identical utterance, skill selector 108 may use the string data (or other representation) representing the utterance to perform a lookup in the storage component 1000. If a match is found, the intent data 1006 and slot data 1008 previously determined for the identical utterance may be retrieved and used for routing the utterance to a particular skill to perform the requested action. As previously described, infrequently used utterances may be added to the cache by determining semantically similar utterances that are either stored in the cache or are part of a corpus of historical natural language processing data. The infrequently used utterance may thereafter be stored in the cache in association with the skill identifiers 1004, intent data 1006, and/or slot data 1008 associated with one or more of the semantically similar utterances.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   determining for first text data representing a first utterance, a first skill previously used to process the first text data;
   determining for the first text data, a second skill previously used to process the first text data;
   storing a first identifier representing the first skill in a cache in association with the first text data;
   storing a second identifier representing the second skill in the cache in association with the first text data;
   determining second text data representing a second utterance;
   searching for cached data in the cache using the second text data;
   determining that the second text data is unrepresented in the cache;
   determining first embedding data comprising a first vector representation of the second text data;
   determining, using cosine similarity, a similarity between the first embedding data and second embedding data representing the first utterance; and
   storing the first identifier and the second identifier in the cache in association with the second text data.

2. The method of claim 1, further comprising:
   receiving audio data representing a third utterance;
   generating third text data representing the third utterance;
   searching the cache using the third text data;
   receiving, from the cache, the first identifier representing the first skill; and
   generating intent data representing the third utterance using the first skill.

3. The method of claim 1, further comprising:
   receiving the second utterance from a first device;
   determining an account associated with the first device; and
   determining that the cache is associated with the account.

4. A method comprising:
   receiving first natural language input data;
   determining a first skill previously used to process the first natural language input data;
   storing the first natural language input data in a storage component in association with first identifier data identifying the first skill;
   receiving second natural language input data;
   determining first data representing a semantic similarity between a first meaning of the first natural language input data and a second meaning of the second natural language input data; and
   storing the second natural language input data in the storage component in association with the first identifier data identifying the first skill.

5. The method of claim 4, further comprising:
   receiving third natural language input data;
   searching stored data using the third natural language input data;
   determining that the third natural language input data corresponds to the first natural language input data;
   determining that the first identifier data stored in association with the first natural language input data identifies the first skill; and
   processing the third natural language input data using the first skill based at least in part on the first identifier data.

6. The method of claim 4, further comprising:
   generating a first vector representation of the first natural language input data;
   generating a second vector representation of the second natural language input data; and
   determining the first data based on at least one of a cosine similarity or Euclidean distance with respect to the first vector representation and the second vector representation.

7. The method of claim 6, further comprising:
   determining a number of times that the second natural language input data has been received within a past time period; and
   determining a threshold number of times related to incorporating new natural language input data into the storage component, wherein the storing the second natural language input data in the storage component in association with the first identifier data is based at least in part on the number of times and the threshold number of times.

8. The method of claim 4, further comprising:
   receiving third natural language input data;
   searching stored data using the third natural language input data;
   determining that the third natural language input data is unrepresented in the storage component;
   generating a first vector representation of the third natural language input data;
   determining a second vector representation of fourth natural language input data represented in the storage component; and
   determining second identifier data associated with the fourth natural language input data in the storage component, the second identifier data identifying a second skill.

9. The method of claim 8, further comprising determining first intent data representing a semantic meaning of the third natural language input data by processing the third natural language input data using the second skill.

10. The method of claim 4, further comprising storing intent data in association with the first natural language input data in the storage component, the intent data representing a semantic meaning of the first natural language input data.

11. The method of claim 4, further comprising:
   receiving third natural language input data;
   determining a number of previous times that the third natural language input data has been received over a first time period;
   determining that the first skill was previously used to process the third natural language input data; and storing the first identifier data identifying the first skill in the storage component in association with the third natural language input data based at least in part on the number.

12. The method of claim 4, further comprising:
receiving third natural language input data;
determining an account associated with the third natural language input data;
determining a cache associated with the account;
searching the cache using the third natural language input data;
determining second identifier data identifying a second skill, the second identifier data associated with the third natural language input data in the cache; and
determining intent data representing a semantic meaning of the third natural language input data using the second skill.

13. A system comprising:
at least one processor; and
at least one storage component, the at least one storage component storing instructions that, when executed by the at least one processor, are effective to:
receive first natural language input data;
determine a first skill previously used to process the first natural language input data;
store the first natural language input data in the at least one storage component in association with first identifier data identifying the first skill;
receive second natural language input data;
determine first data representing a semantic similarity between a first meaning of the first natural language input data and a second meaning of the second natural language input data; and
store the second natural language input data in the at least one storage component in association with the first identifier data identifying the first skill.

14. The system of claim 13, the at least one storage component storing further instructions that, when executed by the at least one processor, are further effective to:
receive third natural language input data;
search stored data using the third natural language input data;
determine that the third natural language input data corresponds to the first natural language input data;
determine that the first identifier data stored in association with the first natural language input data identifies the first skill; and
process the third natural language input data using the first skill based at least in part on the first identifier data.

15. The system of claim 13, the at least one storage component storing further instructions that, when executed by the at least one processor, are further effective to:
generate a first vector representation of the first natural language input data;
generate a second vector representation of the second natural language input data; and
determine the first data based on at least one of a cosine similarity or Euclidean distance with respect to the first vector representation and the second vector representation.

16. The system of claim 15, the at least one storage component storing further instructions that, when executed by the at least one processor, are further effective to:
determine a number of times that the second natural language input data has been received within a past time period; and
determine a threshold number of times related to incorporating new natural language input data into the at least one storage component, wherein the storing the second natural language input data in the at least one storage component in association with the first identifier data is based at least in part on the number of times and the threshold number of times.

17. The system of claim 13, the at least one storage component storing further instructions that, when executed by the at least one processor, are further effective to:
receive third natural language input data;
search stored data using the third natural language input data;
determine that the third natural language input data is unrepresented in the at least one storage component;
generate a first vector representation of the third natural language input data;
determine a second vector representation of fourth natural language input data represented in the at least one storage component; and
determine second identifier data associated with the fourth natural language input data in the at least one storage component, the second identifier data identifying a second skill.

18. The system of claim 17, the at least one storage component storing further instructions that, when executed by the at least one processor, are further effective to determine first intent data representing a semantic meaning of the third natural language input data by processing the third natural language input data using the second skill.

19. The system of claim 13, the at least one storage component storing further instructions that, when executed by the at least one processor, are further effective to store intent data in association with the first natural language input data in the at least one storage component, the intent data representing a semantic meaning of the first natural language input data.

20. The system of claim 13, the at least one storage component storing further instructions that, when executed by the at least one processor, are further effective to:
receive third natural language input data;
determine a number of previous times that the third natural language input data has been received over a first time period;
determine that the first skill was previously used to process the third natural language input data; and
store the first identifier data identifying the first skill in the at least one storage component in association with the third natural language input data based at least in part on the number.

* * * * *